(12) United States Patent
Merksamer (10) Patent No.: US 11,994,320 B2
(45) Date of Patent: May 28, 2024

(54) BERNOULLI HEAT PUMP HAVING LAMINAR FLOW OF REFRIGERANT

(71) Applicant: VENTVIA LTD., Kiryat Tivon (IL)

(72) Inventor: Itzhak Merksamer, Nof Hagalil (IL)

(73) Assignee: VENTVIA LTD., Kiryat Tivon (IL)

( * ) Notice: Subject to any disclaimer, the term of this patent is extended or adjusted under 35 U.S.C. 154(b) by 0 days.

(21) Appl. No.: 17/624,854

(22) PCT Filed: Jul. 9, 2020

(86) PCT No.: PCT/IB2020/056476
§ 371 (c)(1),
(2) Date: Jan. 5, 2022

(87) PCT Pub. No.: WO2021/005557
PCT Pub. Date: Jan. 14, 2021

(65) Prior Publication Data
US 2022/0260286 A1    Aug. 18, 2022

Related U.S. Application Data

(60) Provisional application No. 62/872,282, filed on Jul. 10, 2019.

(51) Int. Cl.
F25B 23/00     (2006.01)
F25B 9/00      (2006.01)

(52) U.S. Cl.
CPC .............. *F25B 23/00* (2013.01); *F25B 9/004* (2013.01)

(58) Field of Classification Search
CPC ........................... F25B 9/00–006; F25B 23/00
See application file for complete search history.

(56) References Cited

U.S. PATENT DOCUMENTS

| 2,726,073 | A | * | 12/1955 | Seld | F02M 9/127 |
| | | | | | 261/76 |
| 3,200,607 | A | * | 8/1965 | Williams | F24F 5/00 |
| | | | | | 62/274 |
| 3,334,026 | A | * | 8/1967 | Dobell | F24S 30/422 |
| | | | | | 202/180 |
| 3,774,645 | A | * | 11/1973 | Pompa | G01F 1/44 |
| | | | | | 138/44 |
| 8,281,605 | B2 | * | 10/2012 | Williams | F25B 9/002 |
| | | | | | 62/238.7 |

(Continued)

FOREIGN PATENT DOCUMENTS

FR        754609      * 12/1933 .............. F25B 23/00
WO   2007017741 A2      2/2007
WO   2013171744 A1     11/2013

OTHER PUBLICATIONS

Singh et al, Effect of nozzle geometry on critical-subcritical flow transitions, Heliyon (Year: 2019).*

*Primary Examiner* — Christopher R Zerphey
(74) *Attorney, Agent, or Firm* — Rivka Friedman (57) ABSTRACT

An improved Bernoulli heat pump, wherein the intake section of a Venturi tube is structured so that when the refrigerant flows from the intake section into and through most of the middle (narrow) section, its flow is essentially laminar. Additionally, a second, bi-phase, component is added to the flowing gaseous refrigerant. Part of the bi-phase component evaporates, reaching super saturation, which state is maintained in the middle section, owing to the laminar flow, increasing heat absorption.

2 Claims, 7 Drawing Sheets

(56) References Cited

U.S. PATENT DOCUMENTS

| | | | |
|---|---|---|---|
| 8,607,579 B2* | 12/2013 | Williams | F28F 13/08 |
| | | | 62/401 |
| 2009/0183858 A1 | 7/2009 | Williams et al. | |
| 2009/0223650 A1 | 9/2009 | Williams et al. | |
| 2009/0249806 A1 | 10/2009 | Williams et al. | |
| 2015/0135741 A1* | 5/2015 | Merksamer | F25D 17/08 |
| | | | 62/89 |

* cited by examiner

The complex potential of the uniform and source stream is given by:

$$W = uz + \frac{q}{2\pi}\ln z \qquad (z = x + iy = re^{i\theta})$$

Where u is the uniform flow velocity and q is the source strength.

Note that complex potential W is divided to $W = \phi + i\Psi$ where $\phi$ is the potential field and $\Psi$ relates to the stream function. Thus:

$$W = \phi + i\Psi = ure^{i\theta} + \frac{q}{2\pi}\ln(re^{i\theta}) =$$

$$= ur(\cos\theta + i\sin\theta) + \frac{q}{2\pi}\{\ln r + i\theta\} =$$

$$= \underbrace{ur\cos\theta + \frac{q}{2\pi}\ln r}_{\phi} + \underbrace{i\{ur\sin\theta + \frac{q}{2\pi}\theta\}}_{\Psi}$$

Next step is to find the stagnation point which must be on the x-axis. From the formula $\frac{dW}{dZ} = u - iv = o$ at the stagnation point (u, v relate to <u>overall</u> cartesian velocity field) and because Z=X there, we obtain:

$$\frac{dW}{dZ} = u + \frac{q}{2\pi Z} = u + \frac{q}{2\pi x_s} = 0 \implies X_s = -\frac{q}{2\pi u} = -C$$

At the stagnation point $\theta = \pi$ where $\Psi(r,\theta) = \Psi(X_s, \pi) = \Psi_s$. Thus $$ur\sin\theta + \frac{q}{2\pi}\theta = \frac{q}{2} \implies ur\sin\theta + \frac{q}{2\pi}(\theta - \pi) = 0$$

From the fact that $r\sin\theta = y$ we get $$uy + \frac{q}{2\pi}(\theta - \pi) = 0 \implies y - \frac{q}{2\pi u}(\theta - \pi) = 0 \implies$$

$$\implies y - c(\pi - \theta) = 0$$

BERNOULLI HEAT PUMP HAVING LAMINAR FLOW OF REFRIGERANT

TECHNICAL FIELD

The invention is directed generally to heat pumps and particularly to heat pumps based on the Bernoulli Effect.

BACKGROUND

Heat pumps—that is cooling—or heating systems—based on the Bernoulli Effect are known and are hereunder referred to as Bernoulli heat pumps. Unlike conventional heat pumps, which use a bi-phase refrigerant, the refrigerant in a Bernoulli heat pump of current art remains in gaseous phase throughout. Typically such a system includes a so-called Venturi tube, which consists largely of three sections in tandem, namely an intake section, formed as a narrowing conduit, a middle section, formed as a narrow tube, and an exhaust section, formed as an expanding conduit. A blower causes the refrigerant to flow through the Venturi tube, whereby its velocity, while flowing through the narrow tube is greatly increased. The thus forced increased velocity of the refrigerant through the middle section causes its temperature to sink, owing to the endothermic aspect of the Bernoulli Effect, and it may thus draw heat from any medium that surrounds the tube (referred to as the heat source or the medium to be cooled). After the refrigerant emerges from the exhaust section its temperature may be higher than its temperature before entering the intake section, owing to the heat dissipated from the heat source. The latter heat is generally dissipated in some medium that serves as a heat sink.

The main advantages of a Bernoulli heat pump over a conventional heat pump are its relative structural simplicity—and therefore relatively low cost—and its relative energetic efficiency. However, Bernoulli heat pumps of current art have a significant disadvantage in that the achievable temperature difference between the heat source (the medium to be cooled) and the heat sink (which is a generally warmer medium) is relatively small—generally not more than about 10 degrees C.

SUMMARY OF THE INVENTION

The goal of the present invention is to provide an improved Bernoulli heat pump that enables achieving a greater temperature differential between the warm- and cold media, while retaining, or even improving, the energetic efficiency of the system—thus overcoming the disadvantage of prior-art systems, mentioned hereabove.

Accordingly a novel feature in embodiments of the invention is to have the intake section structured, or its inner surface formed, so that when the refrigerant flows from the intake section into and through most of the middle (narrow) section, its flow is essentially laminar, i.e. local perturbations in the overall average velocity are relatively small, thus minimizing turbulence, preferably even at high Reynolds numbers. This results in reduced impedance to the flow and thus also reduced energetic load on the blower that draws the refrigerant—which may advantageously lead to inherent energetic efficiency and higher flow velocity, which in turn results in a greater temperature drop.

Another novel feature in embodiments of the invention is the addition of a second, bi-phase, component to the flowing gaseous refrigerant. This component is in liquid phase (e.g., as droplets) while entering the intake section; then, as the pressure of the gas diminishes, due to the aerodynamic aspect of the Bernoulli Effect, while it accelerates through the converging intake section, a part of the liquid component evaporates within the flowing gas component. Moreover, this evaporation may generally lead to a state of so-called super-saturation, where a relatively large amount of vapor is held by the gaseous component; the size of the part of the liquid that evaporates is thus substantial. Since such evaporation is an endothermic process, more heat is extracted from the resultant mixture—in addition to that extracted directly, due to the aforementioned endothermic aspect of the Bernoulli Effect—thus advantageously boosting the resultant overall temperature drop of the refrigerant.

Furthermore, in some embodiments, the vaporized bi-phase component may advantageously cooperate with the previously mentioned novel feature of laminar flow as follows: Owing to the laminar flow, the state of super-saturation may persist while the refrigerant flows through the middle section of the Venturi tube, thus increasing overall heat absorption from the heat source and further reducing the latter's temperature.

Specifically there is disclosed a Bernoulli heat pump, for transferring heat from a heat source to a heat sink, comprising

- a Venturi tube, including a converging intake section, a narrow middle section, and a diverging exhaust section, all interconnected co-axially about a longitudinal axis of the Venturi tube and in tandem, the middle section being in thermal communication with the heat source,
- a refrigerant and
- a blower, disposed at an exhaust end of the exhaust section and operative to cause the refrigerant to flow through the Venturi tube, wherein the intake section, and preferably its inner surface, is configured so as to cause the refrigerant to flow into the middle section in a laminar flow.

Preferably the shape of the inner surface is derivable from a planar flow model, using potential flow theory.

In some embodiments an inner surface of the intake section has a shape formed by rotating a planar curve about the longitudinal axis of the Venturi tube, the curve being defined, in Cartesian coordinates with an abscissa parallel to the longitudinal axis and at a distance $c\pi$ therefrom, by the function $y=c(\pi-\theta)$, where $c$ is a parameter, $y$ is a value, along the ordinate, of any point on the curve and $\theta$ is the angle between the abscissa and a radius vector from the origin of the coordinates to the any point on the curve.

In some embodiments the refrigerant includes a gaseous component and a bi-phase component, intermixed, the heat pump being configured so that the bi-phase component is largely in liquid phase while entering the intake section and a substantial part thereof is in vapor phase while entering the middle section.

In some embodiments the part of the bi-phase component that is in vapor phase when entering the middle section super saturates the gaseous component while within the middle section. Generally, the degree of the super saturation is at least 20%.

In some embodiments the bi-phase component includes at least two different bi-phase fluids.

In some embodiments an upstream end of the intake section and a downstream side of the blower are in fluid communication with the surrounding atmosphere and the gaseous component is atmospheric air, and the Venturi tube further includes one or more nozzles, disposed at the intake section and operative to spray a bi-phase fluid into air flowing therethrough.

In some of these embodiments The heat pump is configured to feed a bi-phase fluid to one or more of the nozzles at an adjustable rate.

In some of these embodiments the bi-phase component includes water and in some of these embodiments the bi-phase component includes a non-aqueous fluid.

In some of the latter embodiments the heat pump is configured to enable recirculating the non-aqueous fluid to any of the nozzles and preferably includes means for extracting the non-aqueous fluid from refrigerant exiting the exhaust section and means for flushing the extracted non aqueous fluid with water.

In some embodiments the heat pump further comprises a refrigerant flow path from the blower to the intake section.

In some of these embodiments the flow path includes a condenser, in thermal communication with the heat sink.

In some of these embodiments the amount of the gaseous component and the amount of the bi-phase component are fixed.

BRIEF DESCRIPTION OF THE DRAWINGS

The invention is herein described, by way of example only, with reference to the accompanying drawings, wherein.

DETAILED DESCRIPTION OF PREFERRED EMBODIMENTS

In common with heat pumps of prior art, embodiments of the present invention include a Venturi tube, consisting largely of three sections in tandem, namely an intake section, formed as a converging conduit, a middle section, formed as a narrow tube, and an exhaust section, formed as a diverging conduit, all configured to let a largely gaseous refrigerant flow therethrough. A blower, preferably downstream the exhaust section, causes the refrigerant to flow through the Venturi tube, whereby its velocity, while flowing through the middle section is greatly increased. The thus forced increased velocity of the refrigerant through the middle section causes its temperature to sink, owing to the endothermic Bernoulli Effect, and it may thus draw heat from any medium that is in thermal contact with the middle section (referred to as the cooled medium or heat source). After the refrigerant emerges from the exhaust section its temperature may be higher than its temperature before entering the intake section, owing to the heat dissipated from the heat source. The latter heat is generally dissipated in some medium that serves as a heat sink.

Unlike Bernoulli heat pumps of prior art, however, the refrigerant in embodiments of the present invention is made to flow into the middle section of the Venturi tube and through at least part of it in a laminar flow. Laminar flow is defined, in the present context, as local perturbations in the velocity of the refrigerant being substantially smaller than the overall average velocity ($v' \ll V$), thus minimizing turbulence. Typically, with such flow, Reynolds stress is under 20-30 $kg/ms^2$—even in refrigerants with high Reynolds numbers, such as air.

This results in reduced impedance to the flow and thus also reduced energetic load on the blower that draws the refrigerant—which advantageously leads to inherent energetic efficiency and higher flow velocity, which in turn results in a greater temperature drop. In some embodiments the laminar flow of the refrigerant may be achieved by appropriately shaping the inner surface of the intake section. Such a shape may be derived from a model of planar laminar flow of two interacting streams of fluids, using potential flow theory, as will be shown in example models further below. A specific example of a shape thus derived will then follow.

Also in contradistinction from Bernoulli heat pumps of prior art, the refrigerant in embodiments of the present invention is composed of at least two intermixed components, one component being a gas and one component being one or more bi-phase fluids. The gas may be any fluid, or combination of different fluids, that remains in gaseous state over the entire range of temperatures and pressures encountered within the heat pump. A bi-phase fluid, in the present context, is such that may undergo a change of phase—between liquid and gaseous—while flowing through the heat pump, according to changing temperature and/or pressure of the refrigerant.

In operation, that is when the refrigerant is flowing through the Venturi tube by the action of the blower, the bi-phase component, while in the intake section, may first be largely in liquid phase (e.g., as droplets); then, as the pressure of the gas diminishes (owing to the aerodynamic aspect of the Bernoulli effect) while it accelerates through the converging intake section, a substantial part of the liquid component may evaporate (i.e. transition to the gaseous phase) within the flowing gas component. Since such evaporation is, by itself, an endothermic process, more heat is extracted from the resultant mixture—in addition to that extracted directly by the endothermic aspect of the Bernoulli Effect—thus advantageously boosting the resultant overall temperature drop. Moreover, the evaporation of the bi-phase component within the gas component may produce a state of super-saturation, so that a greater amount of the bi-phase component may evaporate, thus further decreasing the temperature of the refrigerant and increasing its heat absorption potential. For example, with the gas being air and the bi-phase component being water (as is the case in many embodiments), super-saturation may reach values of typically 20%-40% (i.e. relative humidity values of 120%-140%). Furthermore, owing to the laminar flow of the refrigerant In some embodiments, its state of super-saturation may be retained throughout most, if not all, of the middle section of the Venturi tube, which may advantageously lead to more heat from the heat source being absorbed in the refrigerant (as will be explained below). It will be appreciated that the combination of the novel presence of a bi-phase component in the refrigerant and the novel arrangement for a laminar flow within the middle section of the Venturi tube enables energetically efficient cooling of the heat source to a substantially lower temperature than that achievable in conventional Bernoulli heat pumps. Heat pumps in some embodiments of the invention may typically achieve a temperature difference between the heat source and the heat sink of 15 degrees C.

As a further improvement, in some embodiments of the invention, the bi-phase component of the refrigerant may include two or more bi-phase fluids, having mutually different boiling temperatures and/or vapor pressures. For example, one such fluid may be water and another may be ethanol or another organic liquid. These fluids may all evaporate within the Venturi tube, as described above. Their partial vapor pressures being additive, they may thus cooperate in absorbing even a greater amount of heat from the heat source, especially as both remain in super-saturation in a laminar flow of the refrigerant.

The heat pump according to embodiments of the present invention may be in one of two general configurations—a first configuration being an open air system and a second configuration being a closed circuit system. An embodiment of the open air system consists essentially of a Venturi tube as described above, with a blower disposed at the downstream end of the exhaust section, wherein the front opening of the intake section and the exhausting side of the blower are in effect open to the surrounding atmosphere. Thus the gaseous component of the refrigerant is atmospheric air and the surrounding atmosphere serves as a reservoir of the gaseous component, as well as a heat sink. Disposed within the intake section are preferably one or more spray nozzles, adapted to spray the bi-phase component of the refrigerant (e.g. water), in liquid phase, into the air flowing therethrough. When a fluid in the bi-phase component is water, it may be continuously replenished, whereas it is dissipated in the atmosphere upon the refrigerant being exhausted. When, as in some embodiments, a fluid in the bi-phase component is other than water, it is preferably extracted from the refrigerant when it exhausts from the Venturi tube and is recirculated and sprayed back into the refrigerant within the intake section.

It is noted that some prior art Bernoulli heat pumps (such as disclosed, for example, in U.S. Pat. No. 8,607,579B2) include injection of liquid into a flowing gas. However it remains there largely in liquid state, by design, and its role there is merely to obtain more effective heat exchange with the wall of the middle section of the Venturi tube and not to increase the heat absorption capacity of the refrigerant by evaporation as is the case in the presently disclosed system. Even if in such prior art heat pumps some of the injected liquid were to vaporize, such vapor would condense on the surface of the middle section, because of the inherent turbulent flow; since such condensation is exothermic, it would add heat to the surface (and thus to the heat source)—reversing some of the cooling effect of the evaporation.

An embodiment of the closed circuit system includes, in addition to the Venturi tube, which is followed by a blower (as in the open air system), a relatively wide-diameter conduit, connecting the exhausting side of the blower to the front opening of the intake section, and a condenser, interjected in the conduit and being in thermal contact (possibly through a heat exchanger) with a heat sink. Thus a closed flow path is formed. A dual-component refrigerant (including a gaseous component and a bi-phase component with one or more bi-phase fluids) is present within the flow path and the blower is adapted and operative to continuously circulate it through the flow path. The gaseous component may be any gas (or mixture of gases) and the bi-phase fluids may be any whose boiling point is within the range of temperatures and pressures that would be encountered in the flow path during operation. Typically during operation, the bi-phase component vaporizes in the intake section, as described above; when passing through the exhaust section it begins to condense, owing to the increasing pressure, and when passing through the condenser it fully condenses to liquid, owing to the reduced temperature that results from dissipating heat to the heat sink.

Figure 1:
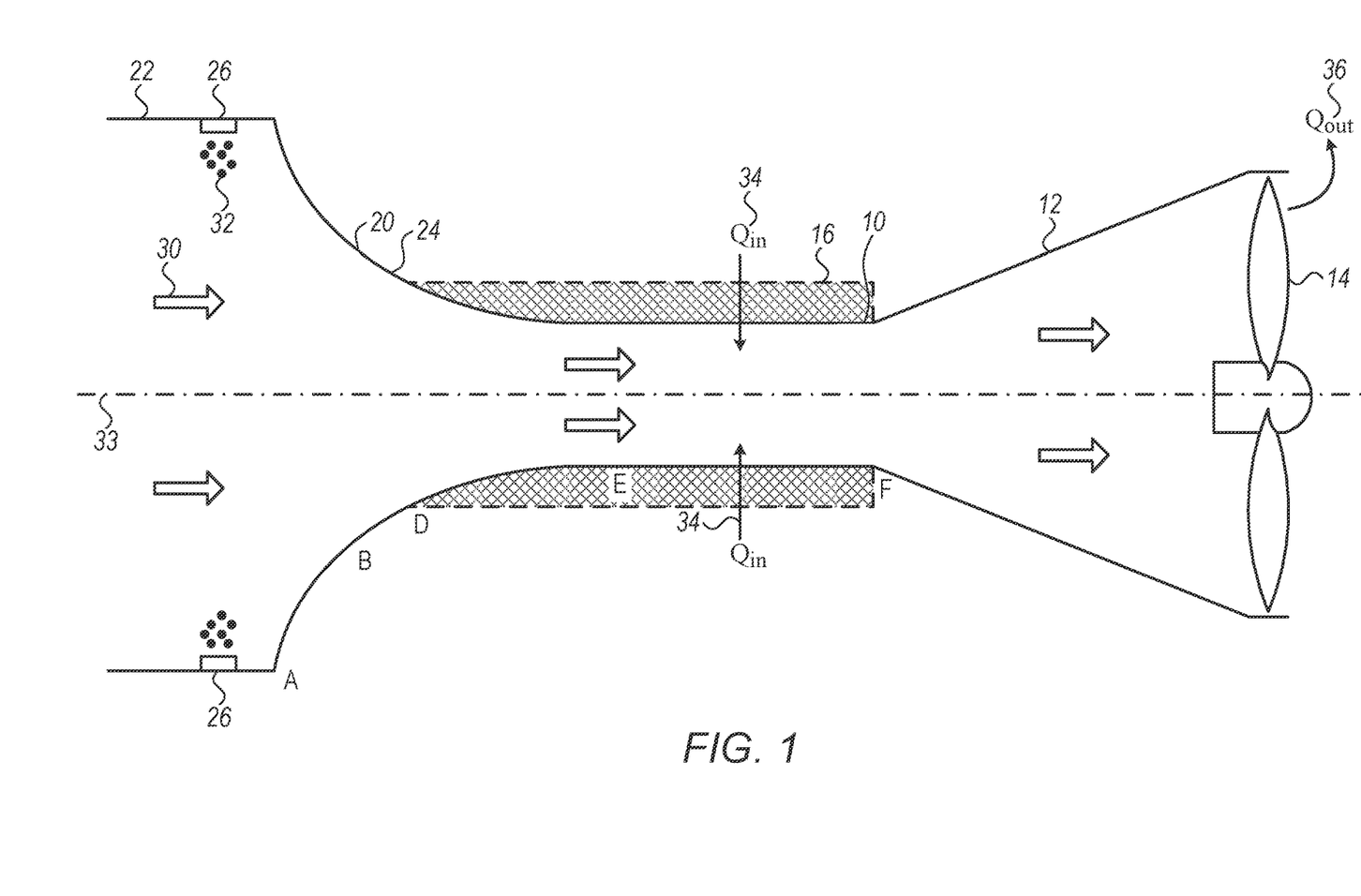
FIG. 1 is a schematic drawing, in a sectional view, of an example embodiment of a heat pump according to the invention, having an open-air configuration.
Figure 3:
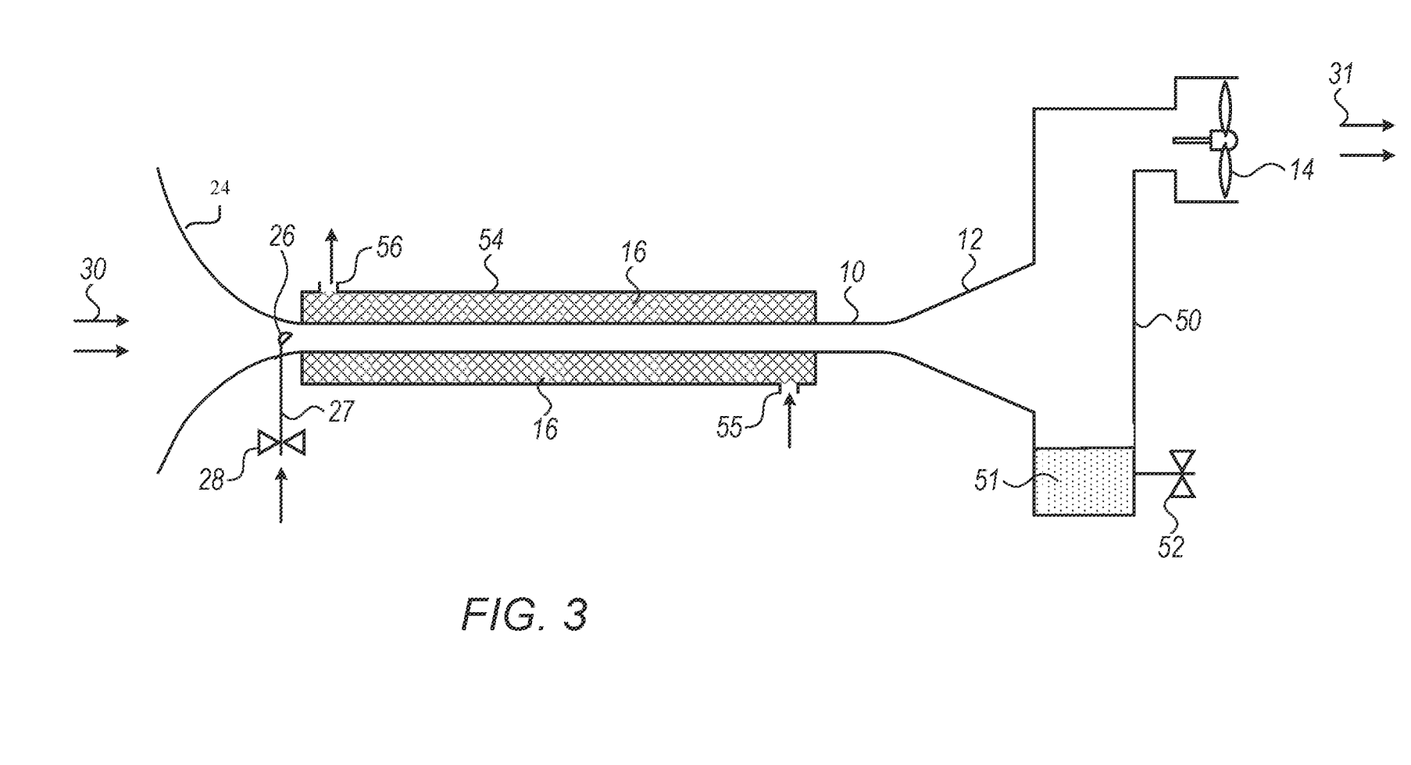
FIG. 3 is a schematic drawing, in a sectional view, of another example embodiment of a heat pump according to the invention, having an open-air configuration.

FIGS. 1 and 3 show, in schematic cross-sectional views, example embodiments of the first general configuration of a heat pump according to the invention, namely an open-air system. FIG. 1 serves to illustrate some basic features of the invention, while FIG. 3 shows the structure of a particular example embodiment in greater detail.

A Venturi tube, circularly symmetric about a central longitudinal axis 33, consists of a middle section, formed as narrow tube 10, connected at one end to an intake section 20, to be described below, and at the other end—to an exhaust section 12. The latter is conically shaped, though in other embodiments it may have any other diverging shape; its narrow end is connected to, and has an inner diameter essentially equal to that of the middle section 10. The wide end of the exhaust section 12 is in fluid communication with the surrounding atmosphere; coaxially disposed therein (or, alternatively, next to it) is a blower 14, which is operative to draw air from inside the exhaust section and throw it into the atmosphere. It is noted that the blower could generally also be positioned in front of the intake section, but that would cause unwanted pressure and turbulence in the intake section and is therefore less desirable.

The intake section 20 includes mainly a converging conduit 24, whose inner surface has a special shape, to be described below; the narrow end of the conduit is joined to the middle section, their inner diameters being essentially equal. Optionally the intake section 20 also includes a short open cylindrical front segment 22, joined to the wide end of the converging conduit 24. The wide end of conduit 24 or the front segment 22 is in fluid communication with the surrounding atmosphere. As a novel feature, the shape of the inner surface of the converging conduit 24 is generally designed to cause the incoming air to flow into the middle section in a laminar manner. Such a shape may be obtained analytically by devising a model of planar laminar flow of two converging streams of fluid, writing equations that characterize the flow, based on potential flow theory, solving them to obtain a boundary line between the streams (which generally is a planar curve) and rotating the resultant curve (which will also be termed "profile curve" or "profile") about an axis, to coincide with the central axis 33 of the converging conduit 24 or of the Venturi tube, to form the desired shape.

Figure 2A:
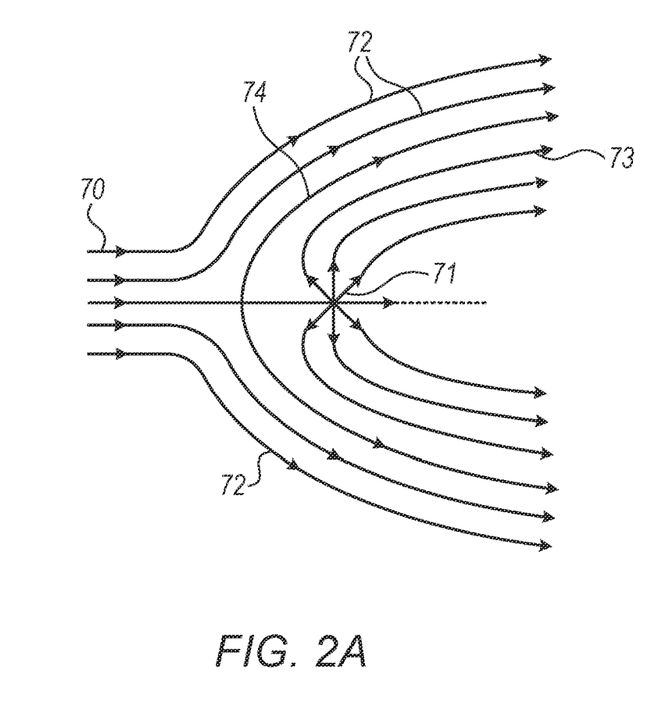
FIGS. 2A and 2B are geometric drawings, illustrating examples of flow models from which the shape of a part of the heat pump of FIG. 1 can be derived.
Figure 2B:
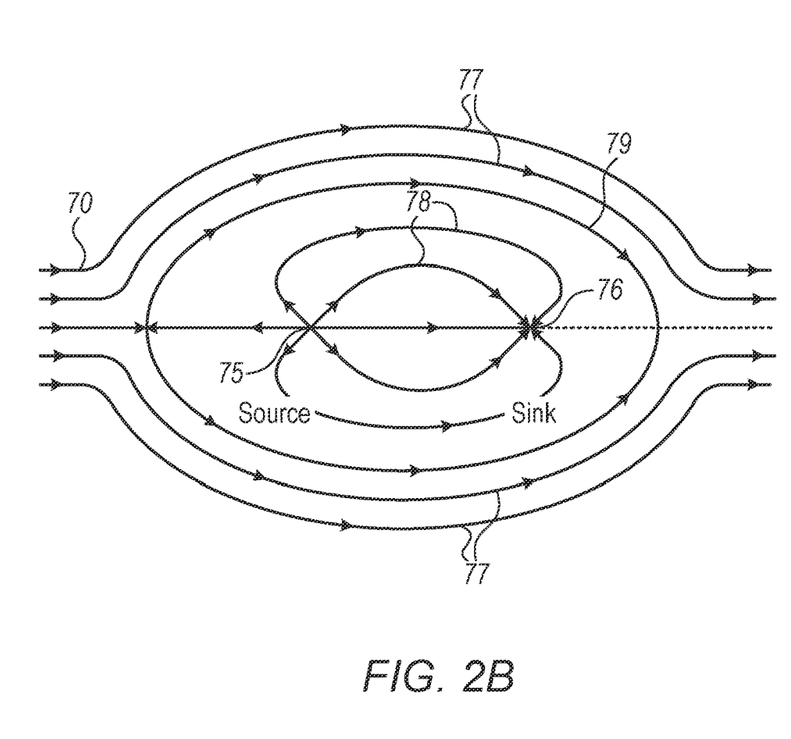
Figure 2C:
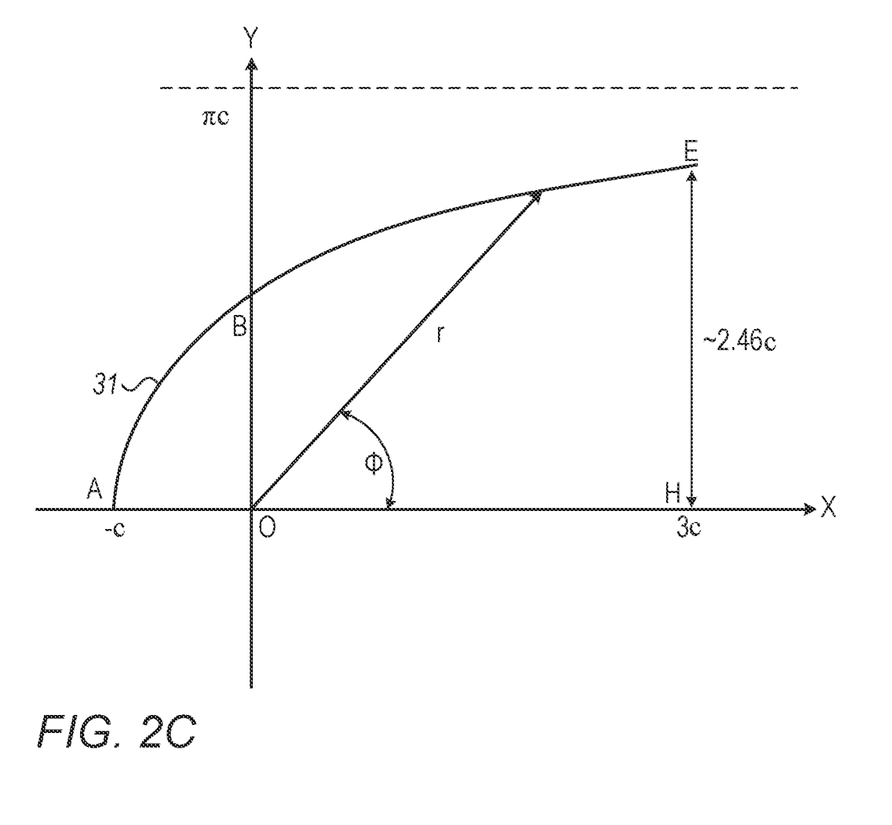
FIG. 2C is a geometric drawing, illustrating a curve for defining the shape of a part of the heat pump of FIG. 1 in some embodiments.

A specific example of such a curve is illustrated in FIG. 2C as the curve 31, where it is shown in relation to Cartesian coordinates x (along an abscissa) and y (along an ordinate), with origin at point O. The curve 31 is preferably defined by the function $y=c(\pi-\theta)$, where c denotes a design parameter and $\theta$ is the angle between the abscissa and a radius vector r from the origin O to any point on the curve. This function may be derived, for example, from a planar model (described below with reference to FIG. 2A) of the confluence between an incoming parallel stream of fluid with an outflow of a similar fluid from a point source, by writing equations for the potential of the flowing fluids and solving them for the so-called line of stagnation, which represents the boundary between the two flowing streams (as explained below with reference to FIG. 2D). As seen in FIG. 2C, the curve has a value y=0 at the point A, where x=−c, a value y=πc/2 at point B, where x=0, and a value of about 2.46c at point E, where x=3c (point H on the abscissa). The curve may extend further, beyond point E, but has been chosen to terminate there from practical function- and design considerations. In any case, the horizontal dashed line at y=πc, represents the asymptote of the curve 31, which is parallel to the abscissa. The shape of the inner surface of the second segment (converging conduit) 24 of the intake section 20 (FIG. 1) is formed by rotating the curve 31 about the asymptote and aligning that asymptote with the longitudinal axis of the intake section 20. Consequently, in the example embodiment, the inner radius of the second segment 24 will be πc at point A, i.e. at its wide end (and this will therefore be also the inner radius of the front segment 22); it will be πc−πc/2=πc/2 at point B and about 0.68c at point E, i.e. its narrow end (and this will therefore be also the inner radius of the middle section 10).

FIGS. 2A and 2B illustrate examples of flow models that may generally serve to obtain a profile curve for rotationally defining the shape of the converging conduit 24. FIG. 2A pertains to the derivation of the curve described above. It illustrates the confluence of a first stream 70, arriving as a parallel uniform flow from the left, and a second stream emerging from a source orifice 71. The fluid in both streams is assumed to have very low Reynolds numbers and therefore all flow is laminar. The first stream is seen to continue to the right along a split path, represented by lines 72, while the second stream is seen to split and bend, to also continue flowing to the right, as represented by lines 73. The boundary between the two streams is denoted by the curved line 74. An appropriate segment of line 74 may serve as the profile curve to define the shape of the converging conduit 24 by rotating it as described above.

By way of another example of a laminar flow model that may be used to derive a profile curve for the converging conduit 24, FIG. 2B illustrates the confluence of, again, a first stream 70, arriving as a parallel flow from the left, and a second stream emerging from a source orifice 75 and draining into sink orifice 76—all having laminar flow. Shown are representative flow lines 77 of the first stream and 78 of the second stream. The boundary between the two streams is denoted by the curved line 79 (which in this case closes on itself). Again, an appropriate segment of line 79 may serve as the profile curve to define the shape of the converging conduit 24 by rotating it as described above.

Figure 2D:
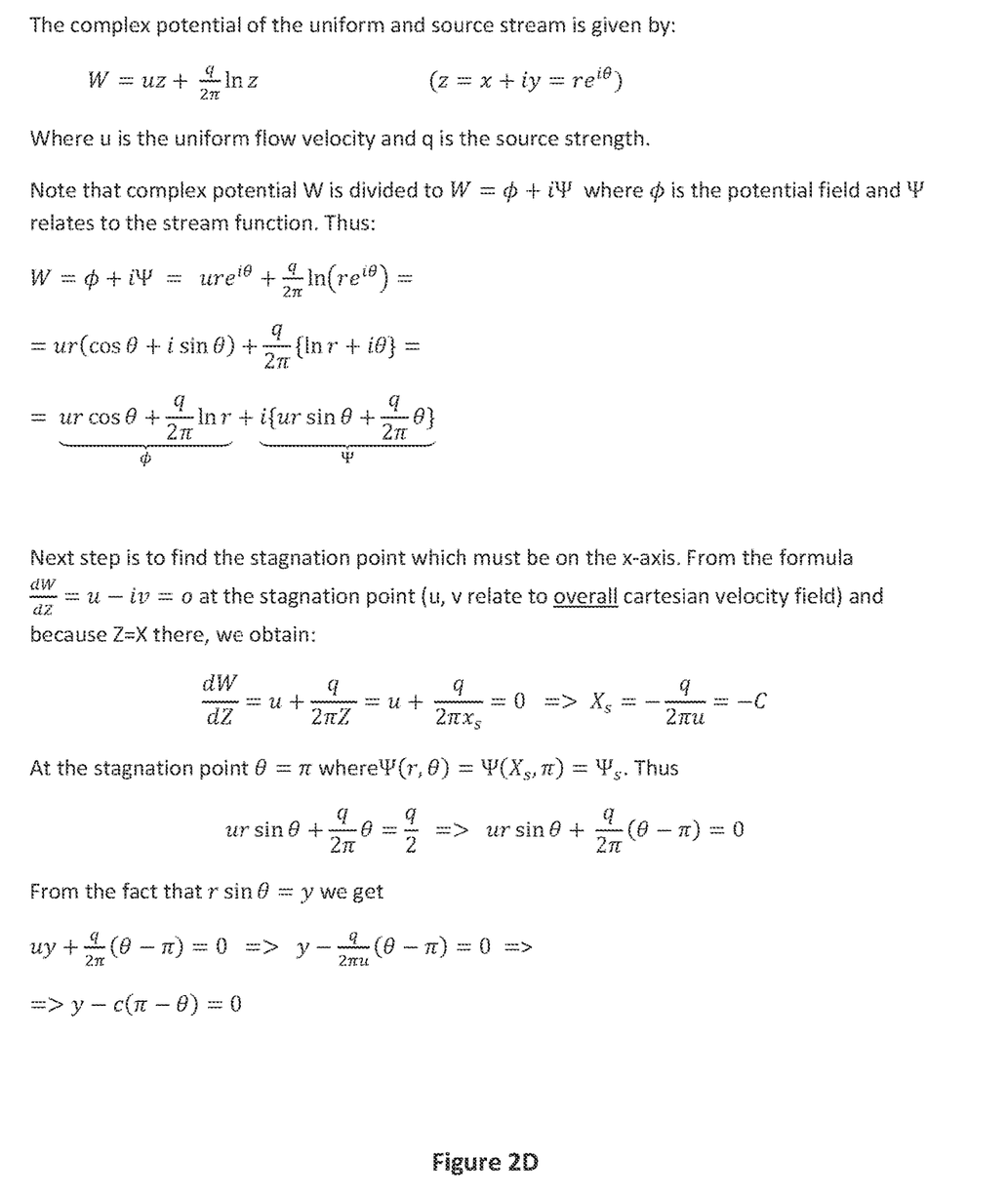
FIG. 2D shows a mathematical derivation of the curve of FIG. 2C from the flow model of FIG. 2A.

An example of the mathematical derivation of the function given above for the profile curve 31, using the flow model of FIG. 2A and potential flow theory, is shown in FIG. 2D. It is noted that this particular mathematic derivation is not binding, and other derivations leading to such a function, using the same model and theory, are possible. Similar derivations may be used to obtain other profile curves from other flow models, such as for example that of FIG. 2B.

In other embodiments the inner surface of conduit 24 may also have other shapes that cause the flow of the refrigerant to be laminar through the middle section—all coming within the scope of the present invention. Moreover, in some embodiments such laminar flow may also be effected by other means, such as appropriately shaped aerodynamic fins or other elements, appropriately positioned within the first section and/or the second section—all coming within the scope of the present invention.

Surrounding the middle section 10 and preferably also a part of the intake section (e.g. between the points D and F in FIG. 1), and in thermal contact therewith, is a heat exchanger 16. The latter is, in turn, in thermal contact with the heat source, which may be a solid or a fluid within an appropriate vessel or conduit. In the embodiment of FIG. 3 the heat source is a fluid that may flow through a conduit 54 surrounding the heat exchanger 16. The fluid may be circulated through the conduit 54, e.g. through openings 55 and 56, from and to any space (not shown) in which it may be needed for cooling or heat extraction. In other embodiments the heat exchanger 16 may be immersed directly in a space to be cooled or from which heat needs to be extracted.

During operation, atmospheric air 30, serving mainly as the gaseous component of the refrigerant, is drawn (by the action of blower 14) into the intake section 20, wherein its flow is accelerated, while flowing in a laminar manner, continues flowing thus through the middle section 10 and then flows, with deceleration, through the exhaust section 12 and blower 14, back to the atmosphere. While the air accelerates through the intake section 20, both its pressure and temperature become reduced, reaching respective minima when reaching the middle section 10. While thus flowing in thermal contact with the heat exchanger 16 (within the middle section and optionally also within part of the intake section), it absorbs heat from the heat source through the heat exchanger 16 (as shown schematically by the arrows 34). This causes the temperature of the heat source to drop and the temperature of the air—to rise. Then while the air decelerates through the exhaust section, its pressure and temperature return to normal and may become higher than that of the atmosphere (owing to the absorbed heat), before eventually mixing with it, thereby dissipating the absorbed heat. It is noted that owing to the laminar flow, the flow rate through the middle section 10 is appreciably higher, for a given power of the blower 14, than if the flow were turbulent (as in prior art Bernoulli heat pumps), and thus the temperature of the flowing air is appreciably lower, enabling reaching a commensurately lower temperature in the heat source and commensurately higher rate of heat absorption therefrom.

Disposed within intake section 20 (e.g. at the wall of the front segment 22, as in the embodiment of FIG. 1, or near the end of conduit 24, as in the embodiment of FIG. 3), are one or more spray nozzles 26, operative to spray a bi-phase refrigerant component 32—preferably water—in liquid phase into the flowing air 30. As shown in FIG. 3, the bi-phase component may be fed to nozzles 26 through a feed tube 27, wherein its feeding rate may be adjusted by a control valve 28.

During operation, the liquid component 32 is dispersed in the air 30 (possibly as droplets or mist) and, as this mixture undergoes reduction of pressure (as described hereabove), a substantial part of the liquid evaporates within the air—enough to super-saturate it. The state of super-saturation may be retained throughout the middle section 10, owing to the laminar flow. It is noted, as an advantageous feature of the invention, that the endothermic effect of the liquid's evaporation is combined with the endothermic Bernoulli Effect, due to the acceleration of the entire refrigerant, to cause the temperature of the entire refrigerant to drop considerably below that achievable with the Bernoulli Effect alone. It is noted that the effect is enhanced by the super-saturation, since a greater proportion of the bi-phase component is thus allowed to evaporate.

While flowing past the heat exchanger 16 the thus cooled refrigerant absorbs heat therethrough from the heat source, as explained hereabove. The rate of heat absorption is increased, however, by the presence of the bi-phase component, owing to the reduced temperature of the refrigerant, as noted above. In addition, the reduced temperature of the refrigerant allows achieving a greater degree of temperature reduction also in the heat source (the medium to be cooled). It is noted that the effect of super-saturation being retained throughout the middle section 10, owing to the laminar flow as described above, may contribute to a further increase in the rate of heat absorption by the refrigerant, as the bi-phase component remains in gaseous state while the refrigerant temperature rises (owing to heat absorption).

Optionally, the spraying rate of the (liquid) bi-phase component may be increased beyond that which can evaporate to super-saturation at the beginning of the middle section, so that part of it remains dispersed in the refrigerant as liquid mist. While the refrigerant flows through the middle section 10 and absorbs heat from the heat exchanger 16, its temperature slightly and gradually rises. As a result, some of the mist may evaporate, thus further contributing to heat absorption and to keeping the refrigerant temperature relatively low.

When the refrigerant flows through the exhaust section 12 and thus expands, its temperature and pressure rise, the latter rise causing the bi-phase component of the refrigerant to condense, or liquefy (again as droplets or mist). Finally, as the exhausting air mixes with the atmosphere, all the heat absorbed by it from the heat source is dissipated by the atmosphere, which thus serves as the heat sink; at the same time the liquid (water) dispersed in the exhausted air is effectively removed from the system.

Referring again to FIG. 3, there is shown, by way of example, an improvement, namely the interjection in the exhaust path (i.e. between the exhaust section 12 and the blower 14) of a precipitation tank 50. It serves for precipitating part of the liquid component, dispersed in the refrigerant, before it reaches the blower 14, thus protecting the blower from accumulation of liquid, which can cause corrosion or otherwise harm it. Precipitated liquid 51 may be accumulated in the bottom part of the precipitation tank 50, wherefrom it may be periodically removed—for example by means of a spigot 52.

Figure 4:
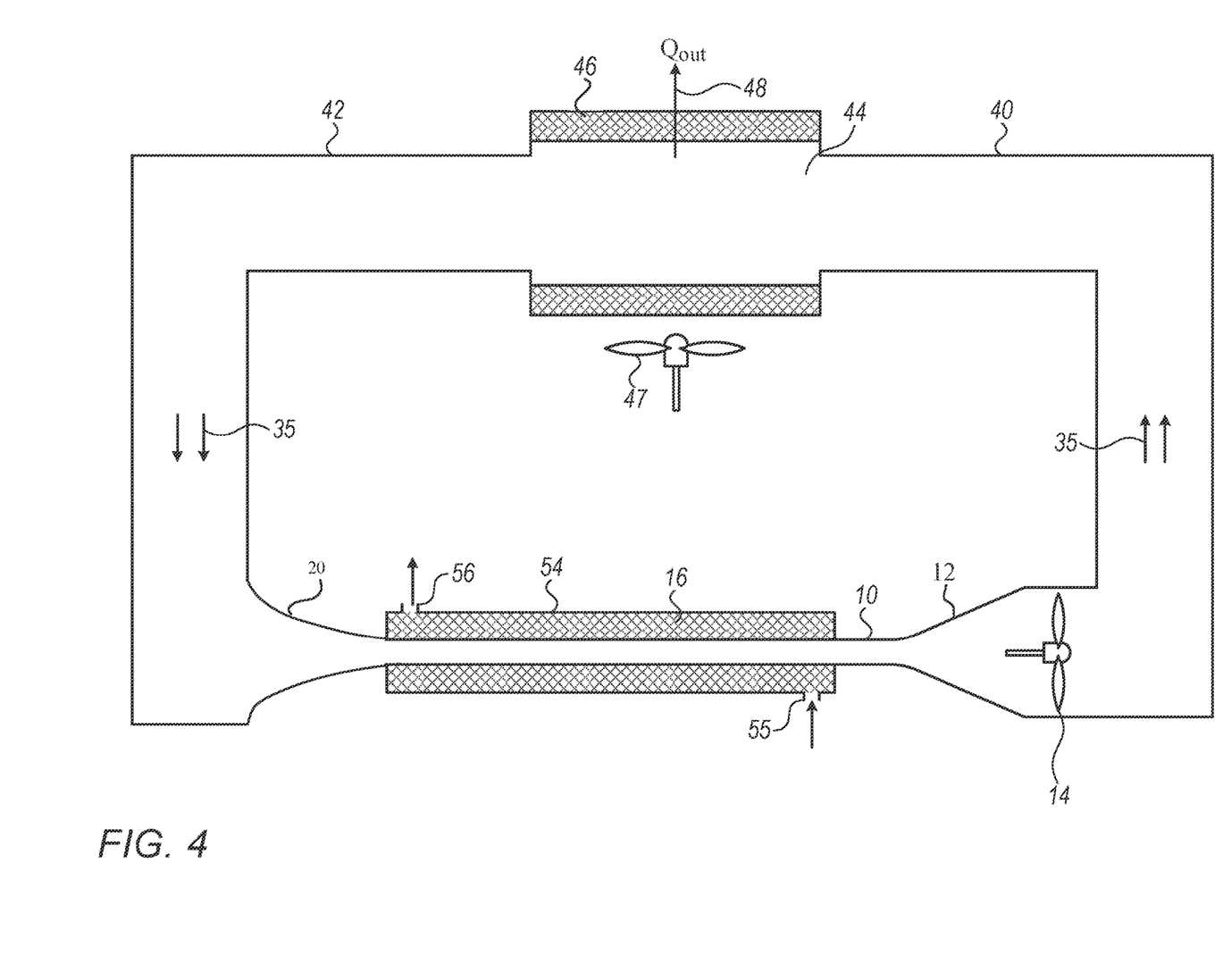
FIG. 4 is a schematic drawing, in a sectional view, of an example embodiment of a heat pump according to the invention, having a closed-loop configuration.

Turning now to FIG. 4, there is shown, in a schematic cross-sectional view, an example embodiment of the second general configuration of the invention, namely a closed-circuit Bernoulli heat pump system. It shares with the first configuration a Venturi tube, including an intake section 20, a middle section 10 and an exhaust section 12, in tandem, as well as a blower 14 and a heat exchanger 16. Also shown in this example embodiment is an optional conduit 54 surrounding the heat exchanger, configured to let a liquid flow therethrough. These are all similar, in structure and function, to the corresponding ones in the configurations of FIGS. 1 and 3, as described above. Not included are the spray nozzles (26 in FIG. 1). The present configuration includes however, in addition, a flow path connecting the wide end of the exhaust section 12 to the wide end of the intake section 20. This path consists of duct 40, condenser 44 and duct 42, in tandem—thus forming together a closed flow circuit. This circuit is permanently filled with a dual-component refrigerant, including a gaseous component and a bi-phase component (which may consist of one or more different bi-phase fluids), all intermixed. During operation this refrigerant 30 continuously circulates through the closed circuit. The condenser 44 is in thermal contact with a second heat exchanger 46, which serves to transfer heat 48 from the refrigerant flowing through the condenser to a medium (not shown), in thermal communication with the heat exchanger 46 and serving as a heat sink. In the illustrated example embodiment the heat sink is surrounding atmospheric air and the heat transfer is aided by a fan 47. In other embodiments the heat sink medium may be, for example a flowing liquid.

The refrigerant components in the closed-circuit heat pump may consist of any suitable substances, including for example air, as the gaseous component, and water, as the bi-phase component. The choice of suitable substances may depend on the particular application, external conditions and functional requirements, such as the required rate of heat dissipation or the ranges of temperatures in the warmed- and cooled media. The bi-phase component preferably includes one or more fluids with a relatively high vapor pressure (i.e. a relatively large proportion thereof evaporates within the gaseous component under super-saturation). Examples of such a fluid, other than water, are Freon and various organic fluids, such as ethanol.

Operation of the system of FIG. 4 is as follows: The refrigerant is circulated 35 through the entire circuit by means of the blower 14. When emerging from the condenser and flowing through duct 42, the bi-phase component is largely in liquid phase and may form droplets or mist dispersed within the gas. When accelerating through the intake section 20, the entire refrigerant cools down, owing to the Bernoulli effect, while the liquid evaporates, owing to the reduced pressure—causing further cooling and resulting in a temperature considerably below that of the heat source. The flow through the intake section and thereafter through the Middle section 10 is laminar, owing to the special shape of the inner surface of the intake section (which shape may be similar to that in the system of FIG. 1, as explained above), and thus the refrigerant remains supersaturated, i.e. without significant condensation. While flowing through the far portion of the intake section and the middle section (e.g. between points D and F in FIG. 1), the thus cooled refrigerant absorbs heat from the heat source (not shown) through the heat exchanger 16—further cooling it.

When expanding through the exhaust section 12, the refrigerant undergoes a rise in pressure and in temperature. After passing through the blower 14 and while flowing through duct 40, the pressure is further raised by the action of the blower. Consequently the bi-phase component begins to condense, which is an exothermic process and thus further raises the temperature—to considerably above that of the heat sink. While passing through the condenser 44, the refrigerant transfers heat 48 to the heat sink (not shown), through the heat exchanger 46, and thus is cooled down. Consequently more of the bi-phase component condenses, or liquefies, and the cycle begins again as described above.

Figure 5:
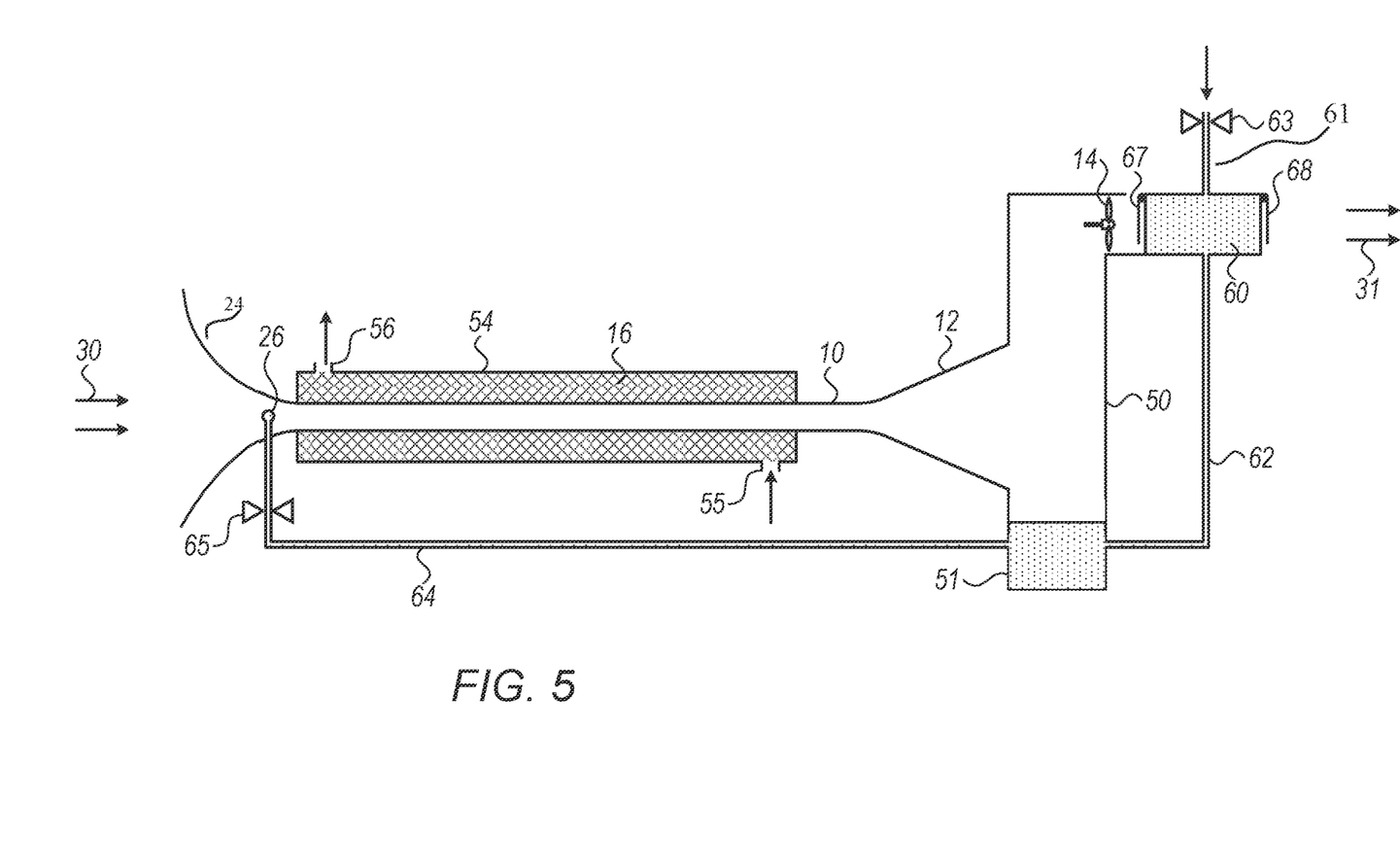
FIG. 5 is a schematic drawing, in a sectional view, of another example embodiment of a heat pump with an open-air configuration, enabling recirculation of a bi-phase fluid in the refrigerant.

Open-air Bernoulli heat pumps, in embodiments such as illustrated in FIGS. 1 and 3, are relatively economic when the bi-phase component is water, because water can be continuously replenished, i.e. fresh water can be fed to the spray nozzles, while condensed water in the exhausting refrigerant is dissipated in the atmosphere. However, as mentioned hereabove with respect to a closed-circuit configuration, it may at times be advantageous to employ a fluid other than water in the bi-phase component. Continuous replenishment would then be generally uneconomical. FIG. 5 is a schematic section drawing of an example embodiment of an open-air Bernoulli heat pump, featuring recirculation of such a bi-phase fluid, thus advantageously enabling the bi-phase component to economically include any suitable fluid, such as mentioned hereabove.

The example embodiment illustrated in FIG. 5 is similar to that of FIG. 3 in that it includes an open-air Venturi tube, which includes an intake section 20 (with a converging conduit 24 shaped for laminar flow), a narrow middle section 10 and an exhaust cone 12, followed by a precipitation tank 50 and a blower 14. This embodiment also similarly includes a heat exchanger 16, in thermal contact with the middle section 10, optionally surrounded by a conduit 54 to let a heat source medium flow therethrough. The embodiment of FIG. 5 includes, however, additionally a fluid extraction box 60, placed downstream from the blower 14; in other embodiments it may be placed upstream from the blower—e.g. at the top of the precipitation tank 50. The fluid extraction box 60 may be filled with a porous material that lets the exhausting refrigerant flow therethrough and, during such flow, acts to absorb or adsorb at least part of the fluid, in liquid phase, dispersed in the refrigerant. This material may be, for example, activated charcoal. The fluid extraction box 60 is preferably provided with shutters 67 and 68, at, respectively, an entrance window and an exit window thereof. Fluidly connected to the fluid extraction box 60 are a flush feed tube 61, whose other end is connected through a valve 63 to a mains water supply, and a flush drain tube 62, whose other end is fluidly connected to the bottom of the precipitation tank 50, where bi-phase fluid 51, in liquid phase, may be accumulated. A liquid feed tube 64 connects between the bottom of the precipitation tank 50 and one or more spray nozzles 16 in the intake section 20—through a flow control valve 65. The fluid in the pool 51 is typically a mixture (to be further discussed below) of water and one or more other bi-phase fluids.

The heat pump of FIG. 5 may operate basically similarly to the embodiment of FIG. 3, described above, whereby air, mixed with a bi-phase fluid flows through the entire Venturi tube, but (as a novel feature) it is exhausted through the fluid extraction box 60. Also as a novel feature, the bi-phase fluid sprayed into the flowing air is continuously fed to the nozzles 16 through the liquid feed tube 64, from the pool of liquid 51 at the bottom of precipitation tank 50. The nozzles 16 are preferably placed near the narrow end of the converging conduit 24, where the air pressure is already lower than in the atmosphere; thus the fluid is made to flow from the pool 51 out the nozzles 16 by the pressure differential. The rate of this flow may be regulated by control valve 65. As the exhausting refrigerant flows through the top of precipitation tank 50, some of the liquefied bi-phase fluid dispersed therein may precipitate to the bottom of the tank, joining the pool 51. As the exhausting refrigerant continues to flow through the fluid extraction box 60, most of the remaining non-aqueous part of the liquefied fluid dispersed therein may be absorbed or adsorbed by the porous material (e.g. activated charcoal) therein and thus extracted from the exhausting refrigerant.

With time, extracted fluid may accumulate in the fluid extraction box 60. Therefore it may become necessary from time to time to flush the accumulated fluid from the fluid extraction box and return it to the pool 51. This process may be carried out as follows: The action of the heat pump is temporarily stopped (by stopping the blower 14); the shutters 67 and 68, which are normally in open positions (e.g. flipped up) are temporarily shut (as schematically shown in the drawing); the valve 63 is opened so as to let water from the mains to flow through the feed tube 61, the fluid extraction box 60 and the flush drain tube 62 to the pool 51. During this process, the flowing water dissolves the fluid absorbed or adsorbed by the material in the fluid extraction box and flushes it down into the pool. At the end of the process, normal action of the heat pump may resume. It will be appreciated that in this manner the non-aqueous part of the bi-phase component of the refrigerant is largely recirculated; only marginal quantities thereof, lost to the atmosphere, may need to be replenished. It is noted that most of the aqueous part of the bi-phase component, in contrast, is not recirculated, but is replenished by the flushing water during the process described above.

In the example embodiment of FIG. 5, as described above, the bi-phase component of the refrigerant is composed of two parts—water and a non-aqueous fluid. The water is required in this embodiment to flush the extracted non-aqueous fluid. In other embodiments other means for extracting and recirculating the non-aqueous fluid may be employed, such that do not require an additional fluid. In such embodiments, which are within the scope of the present invention, a single non-aqueous fluid may serve as the bi-phase component of the refrigerant (as may be the case in a closed-circuit heat pump, such as that described with reference to FIG. 4). However, as mentioned above, it may in general be advantageous to employ two or more different fluids as bi-phase components—in any configuration of the heat pump. This is due to the fact that when they vaporize within the gaseous component, their partial vapor pressures are additive—even in the super-saturated state. Thus each of them may independently contribute to the heat absorbing capacity of the refrigerant while flowing through the middle section of the Venturi tube and thus they may enable a greater overall cooling effect.

It will be appreciated that the numerical examples in the above description are by way of example only and may vary in a design optimization process. It will also be appreciated that in various embodiments of the invention two or more of its aspects may be combined into an optimized design. It will furthermore be appreciated that the above descriptions are intended only to serve as examples, and that many other embodiments are possible within the scope of the present invention as defined in the appended claims.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

The invention claimed is:

1. A Bernoulli heat pump, for transferring heat from a heat source to a heat sink, comprising —
    a Venturi tube, including a converging intake section, a narrow middle section, and a diverging exhaust section, all interconnected co-axially about a longitudinal axis of the Venturi tube and in tandem, the middle section being in thermal communication with the heat source, and
    a blower, disposed at an exhaust end of the exhaust section and operative to cause a refrigerant to flow through the Venturi tube,
    an upstream end of the intake section and a downstream side of the blower being in fluid communication with the surrounding atmosphere and said refrigerant including air;
    wherein said Venturi tube further includes one or more nozzles, disposed at the intake section and operative to spray a bi-phase fluid into air flowing therethrough and wherein the heat pump further comprises —
        a precipitation tank, disposed in the refrigerant flow path downstream the exhaust section and configured with a bottom to accumulate precipitated liquid, and
        a liquid feed tube, one end of which is fluidly connected to the bottom of the precipitation tank and a second end of which is directly or indirectly in fluid communication with any of said nozzles.

2. The heat pump of claim 1, wherein said bi-phase fluid includes a non-aqueous fluid, the heat pump further comprising —
- a fluid extraction box, disposed in the refrigerant flow path downstream the exhaust section or the blower and including porous material operative to absorb or adsorb non-aqueous fluid from the refrigerant and
- means for flushing extracted non aqueous fluid from the fluid extraction box to the bottom of the precipitation tank.

\* \* \* \* \*